United States Patent
Dockser et al.

(10) Patent No.: US 7,454,538 B2
(45) Date of Patent: Nov. 18, 2008

(54) LATENCY INSENSITIVE FIFO SIGNALING PROTOCOL

(75) Inventors: Kenneth Alan Dockser, Cary, NC (US);
Victor Roberts Augsburg, Cary, NC (US); James Norris Dieffenderfer, Apex, NC (US); Jeffrey Todd Bridges, Raleigh, NC (US); Robert Douglas Clancy, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 11/128,135

(22) Filed: May 11, 2005

(65) Prior Publication Data

US 2006/0259669 A1 Nov. 16, 2006

(51) Int. Cl.
*G06F 3/00* (2006.01)
(52) U.S. Cl. .............................. 710/52; 710/53; 710/58; 710/60
(58) Field of Classification Search ........................ None
See application file for complete search history.

(56) References Cited

U.S. PATENT DOCUMENTS

| | | | |
|---|---|---|---|
| 5,506,969 A * | 4/1996 | Wall et al. ................... 710/107 |
| 5,513,224 A | 4/1996 | Holt | |
| 5,604,866 A * | 2/1997 | Kolb et al. ................... 709/235 |
| 6,098,139 A | 8/2000 | Giacobbe et al. | |
| 6,101,329 A | 8/2000 | Graef | |
| 6,115,760 A | 9/2000 | Lo et al. | |
| 6,529,570 B1 * | 3/2003 | Miller et al. ................. 375/354 |
| 6,892,253 B2 * | 5/2005 | Robertson ..................... 710/52 |
| 2002/0172156 A1 | 11/2002 | Sandbote | |

OTHER PUBLICATIONS

Newton, Harry, Newton's Telecom Dictionary, Feb. 2002, CMP books, 18th Edition, p. 682.*

* cited by examiner

*Primary Examiner*—Eron J Sorrell
(74) *Attorney, Agent, or Firm*—Nicholas J. Pauley; Joseph B. Agusta; Thomas Rouse (57) ABSTRACT

Data from a source domain operating at a first data rate is transferred to a FIFO in another domain operating at a different data rate. The FIFO buffers data before transfer to a sink for further processing or storage. A source side counter tracks space available in the FIFO. In disclosed examples, the initial counter value corresponds to FIFO depth. The counter decrements in response to a data ready signal from the source domain, without delay. The counter increments in response to signaling from the sink domain of a read of data off the FIFO. Hence, incrementing is subject to the signaling latency between domains. The source may send one more beat of data when the counter indicates the FIFO is full. The last beat of data is continuously sent from the source until it is indicated that a FIFO position became available; effectively providing one more FIFO position.

14 Claims, 7 Drawing Sheets

Fig. 2(B)  Timing Diagram – Two cycle latency

LATENCY INSENSITIVE FIFO SIGNALING PROTOCOL

TECHNICAL FIELD

The present subject matter relates to protocols for signaling and control, related to transfer of data via first-in-first-out (FIFO) storage devices and equipment implementing such signaling protocols.

BACKGROUND

First-in-first-out (FIFO) storage devices are used in processors and communications applications involving transfers of data between different domains, commonly where the domains may operate at different data rates. While the data rates differ, and often vary, between the domains, the signals between them may be clocked relative to the same fundamental clock frequency (i.e., synchronous) or clocked relative to different fundamental clock frequencies (i.e., asynchronous). In a synchronous application, the buffering provided by the FIFO compensates for differences in the data rates of the two domains. In an asynchronous application, the buffering provided by the FIFO compensates for differences in the both the data rates and the clock frequencies of the two domains. In either case, the buffering helps to avoid data loss due to transfer of data at times or speeds when the receiving domain can not handle it and/or to avoid data duplication because the receiving domain is expecting and ready to receive additional data while the sending domain is still transferring prior data.

Most FIFO implementations, however, are limited by the finite size or depth of the memory or register array implementing the FIFO buffer. For example, data may still be lost if the sending domain sends more data when the FIFO storage device is already full of data awaiting transfer to the sink in the receiving domain. Various techniques have been developed to feed information about the fill level and/or write status of the FIFO, from the receiving or sink domain to the sending or source domain. However, need for further improvement in such techniques remains.

SUMMARY

A counter tracks space available in the FIFO and the source side uses the count to control transfer of data. To enhance transfer control, the counter is implemented on the source side while the FIFO is implemented on the receiver side. The counter is responsive to a signal on the source side that represents a ready state of data for transfer, e.g. that new data has been loaded into a register on the source side and is available to the FIFO storage device. Because the counter is on the source side, there is no propagation delay (i.e., delay within the current cycle) nor latency (i.e., delay of one or more cycles) incurred in receiving and responding to this signal. The counter also is responsive to a signal that space has become available in the FIFO storage device, sent for example, when data is output from and space cleared in the FIFO storage device. This later signal, however, is sent from the sink domain to the source domain, and the counter operation is subject to any latency incurred in communicating the signal between the domains.

An exemplary method enables transfer of data between a source domain operating at a first data rate and a sink domain operating at a second data rate different from the first data rate, via a first-in-first out (FIFO) storage device in the sink domain. The method entails loading data into a register in the source domain to make the data available to the sink domain and providing a data ready signal, when the source has data ready for transfer. In this example, the value representing space available in the FIFO storage device, maintained in the counter in the source domain, is decremented in response to the data ready signal. The method also involves signaling data ready state to the sink domain, based on the data ready signal. Upon receipt of the signaling of the data ready state in the sink domain, the FIFO storage device is activated to load the available data from the register in the source domain into the FIFO storage device. At some point, data is output from the FIFO storage device to a data sink, thus clearing a space in the FIFO storage device. The method also entails signaling the clearing of space in the FIFO storage device to the counter in the source domain. In response to receipt of this signaling, the counter increments the value representing space available in the FIFO storage device. The loading of the ready data into the register in the source domain to make the data available to the sink domain is controlled in response to the value representing space available in the FIFO storage device, maintained in the counter in the source domain.

Two different signaling techniques or protocols are disclosed. One technique involves sending a data ready pulse signal to a register in the sink domain. Although each pulse consists of a single cycle, the register in the sink domain holds the pulse, and provides a continuous ready indication, until cleared following completion of the loading of new data into the FIFO storage device.

The other disclosed technique utilizes 'ping-pong' signaling. This entails changing a signaling register state from a prior valid data ready state to an alternate valid data ready state. Essentially, the register output alternates (ping-pong) between the two valid data ready states, as new beats of data successively become available for transfer. A multiplexer (MUX) or the like, on the sink side, indicates a new beat of data is ready, in response to each transition between the two alternate states. A control element on the sink side uses this data-ready indication from the MUX to control input to the FIFO.

Another example of a method for transferring data covers a plurality of potentially overlapping cycles of transfer between the source domain and the sink domain. Each transfer cycle, which typically occurs over a plurality of clock cycles, entails loading data from a source into a register in the source domain; signaling data ready to the sink domain; loading the data from the register in the source domain into a first-in-first-out (FIFO) storage device in the sink domain; outputting data from the FIFO storage device to a sink device and clearing space for data in the FIFO storage device; and signaling the output of data and clearing of space in the FIFO storage device to the source domain. A count value maintained in the source domain is modified in a first manner (e.g. decremented or incremented), in response to each loading of data into the register in the source domain. The count value is modified, in an opposite manner (e.g. incremented or decremented) in response to each signaling of the clearing of space in the FIFO storage device to the source domain. Control of loading of data from the source into the register in the source domain, in successive transfer cycles, is based on a current state of the value of the counter. The step of loading data from the source register into the FIFO may also include the transferring of data and the ready signal through one or more intermediary registers as would be typically done when the transfer from the source register to the FIFO cannot physically occur in a single clock cycle.

Yet another example of a method for transferring data between domains involves a number of repetitions of steps, include loading data from a source into a register in the source domain, and making the data available to the sink domain; when space is available in a first-in-first-out (FIFO) storage device in the sink domain, loading the data from the register in the source domain into the FIFO storage device; and outputting data from the FIFO storage device to a sink device to clear space for data in the FIFO storage device. This method also involves maintaining a count in the source domain representative of space available in the FIFO storage device. The count is maintained in response to each loading of data into the register in the source domain and in response to signaling from the sink domain of each clearing of space in the FIFO storage device. For each repetition of the step of loading data into the register in the source domain, there is a related step of controlling the loading of data from the source into that register based on a current state of the count. Also, in the event the count indicates that the FIFO storage device is full, the method allows for loading of a next available beat of data into the register in the source domain and holding that beat of data so that the beat of data is continuously made available to the FIFO storage device for loading into the FIFO storage device when space becomes available.

Specific apparatus, using these or similar control and signaling techniques to transfer data between domains, also are disclosed. An example of such an apparatus might include a read data register in the source domain, for receiving data from a source and presenting received data for transfer to the sink domain. A first-in-first-out (FIFO) storage device, in the sink domain, receives data from the read data register for transfer to a sink. The apparatus also includes a counter in the source domain. The counter is responsive to loading of data into the read data register and off-loading of data from the FIFO storage device. The value maintained in the counter represents space available in the FIFO storage device. The apparatus further includes a control in the source domain, for controlling loading of data into the read data register for transfer to the sink domain, responsive to the count value.

In one aspect, upon indication that the FIFO storage device is full by the count value in the counter, the controller allows loading of a next available beat of data into the read data register. The read data register holds that beat of data so as to be continuously presented to the FIFO storage device for loading into the FIFO storage device when space becomes available.

In another aspect, the apparatus includes means for signaling when data is in the read data register for transfer to the FIFO storage device, to the sink domain to control the receipt of data by the FIFO storage device. Several examples of appropriate signaling techniques are disclosed.

Objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
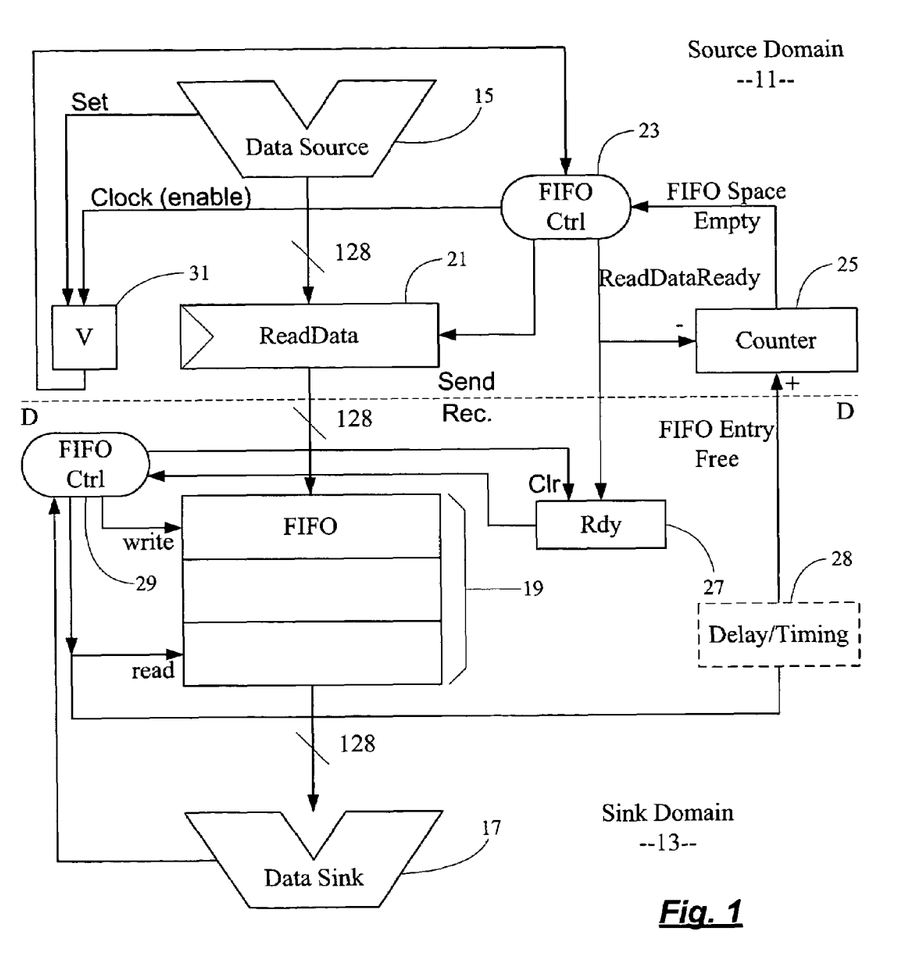
FIG. 1 is a functional block diagram of elements transferring data between domains via a first-in-first-out (FIFO) buffer and elements for signaling and control of the data exchange.

The technology disclosed herein relates to protocols for signaling and control related to transfer of data to and from first-in-first-out (FIFO) storage devices and to equipment using such protocols. Reference now is made in detail to the examples illustrated in the accompanying drawings and discussed below. FIG. 1 illustrates a first example of a system implementing the FIFO-related signaling protocol.

The illustrated system includes elements in two different domains, a source domain 11 desiring to send data and a sink domain 13 intended to receive the data. Essentially, an element in domain 11 represented generically by data source 15 has data available, and an element in domain 13 represented generically by the data sink 17 needs to receive that data for further processing, storage or the like.

The two domains are separated by a domain boundary, represented by the dotted line D-D. The two domains may be different regions of a single semiconductor chip separated by a boundary region, such as different core portions of a processor chip. The different domains also may be different chips, or different devices connected via wiring, through a series of one or more registers, or other interface means, or two separate systems communicating via a local or wide area network. Operations of the circuits in the two domains may be clocked relative to the same fundamental clock frequency (i.e., synchronous) or clocked relative to different fundamental clock frequencies (i.e., asynchronous).

For ease of discussion, it is assumed that the two domains are synchronous and represent elements in close proximity that are directly connected together across the boundary, for example, two sections of a processor chip interconnected or coupled together across a boundary region of the chip. The separation of the two sections may be physical, e.g. two separate parts or areas of the chip, or the separation may be purely logical that is to say simply between components operating at the data rate of the first domain and components operating at the data rate of the second domain.

Thus, the data rates of the two domains differ. Elements in the source domain 11 operate at one data rate, whereas elements in the sink domain 13 operate at another somewhat different data rate. The data rate of the sink domain 13 and thus the data sink device 17 may be slower or faster than the data rate of the source 15 in the domain 11. Also, the data rates and thus the difference in the data rates may vary over time, e.g. as processing operations of the source 15 and the sink 17 vary. In the exemplary timing diagrams (FIGS. 2(A) to 2(C)), the sink data rate is somewhat slower than the source data rate. While in the examples the clock rates are identical, benefit may also be gained when the clocks are different, using techniques known to those skilled in the art.

Returning to FIG. 1, to compensate for the data rate difference of the domains 11 and 13 across the boundary D-D, the sink domain 13 includes a first-in-first-out (FIFO) storage device 19, essentially for buffering data received from the source domain 11. The buffering compensates for differences in the data rates of the two domains 11 and 13, to avoid data loss due to transfer of data at times or speeds, when the receiving domain can not handle it, and/or to avoid data duplication because the receiving domain 13 is expecting and ready to receive additional data while the sending domain 11 is still transferring prior data.

The FIFO storage device 19 may be implemented in any of a wide variety of physical architectures, such as registers or memories. For discussion purposes, it is convenient to think of the FIFO 19 as a series or stack of registers through which received data moves. However, FIFO devices often utilize memory and provide first-in-first out operations by appropriate manipulation of the memory addressing used during read and write operations. One register or location is filled when a new beat of data, 128 bytes in the example, is loaded or written into the FIFO storage device 19. One register or location is cleared when a beat of data is offloaded or read off of the FIFO storage device 19 to the sink 17.

On the source or sending side 11, the data source 15 supplies a beat of data, in this example 128 bits of data, to a register 21, sometimes referred to as a read data register. In the example, the register 21 is designated as the read data (Read-Data) register. The ReadData register 21 holds the 128 bits of data and presents the bits of data on the lines for transferring the data across the boundary D-D to the input of the FIFO storage device 19. Although not shown in the drawing, additional logic may exist after the read data register and before the FIFO. While the register 21 holds the new beat (128 bytes) of data, the data is available on the lines to the input of the FIFO storage device 19. However, when the new beat of data is first loaded into the register 21, there is some propagation delay before the data appears at the input of the FIFO storage device 19 in the sink domain 13.

A FIFO control 23 controls the flow of data to and through the ReadData register 21. The FIFO control 23 is a finite state machine. The state machine may be implemented as a programmable processor but typically is formed of circuits and/or logic blocks for generating desired outputs in response to the specific inputs, that is to say, so as to implement the particular source-side control algorithm. When the source 15 has new data to send, the FIFO control 23 causes the Read-Data register 21 to present the new data if there was space available in the FIFO storage device 19 for the last beat of data, as indicated by a register-use counter 25. The range or initial value of the counter corresponds to the depth of the FIFO. Hence, the control 23 can determine if space is available in the FIFO by examining a state of the counter, e.g. if the count is not yet negative (no space available). As discussed more below, it is advantageous that the counter 25 is an element in the source domain 11. Although shown as a separate element, the counter 25 may be integrated as part of the state machine serving as the FIFO control 23.

When the FIFO control 23 causes the ReadData register 21 to present the new data for input to the FIFO storage device 19, the FIFO control 23 signals the sink domain 13 by generating a ready pulse, referred to in the example as the Read-DataReady signal. This signal is typically a pulse asserted for a single clock cycle, which means it is not a state signal held high (or low) for the time that the data is held available by the ReadData register 21. In the sink domain, the ReadDataReady pulse signal is applied to a register 27, designated as the ready (Rdy) register in the exemplary figure. When the register 27 receives a ready pulse, it provides a state signal, signifying data is ready for transfer to FIFO control 29 in the sink domain 13. The register 27 maintains the ready state (holds the pulse) until cleared by the FIFO control 29.

In the sink domain 13, the FIFO control 29 is another finite state machine. The state machine may be implemented as a programmable processor but typically is formed of circuits and/or logic blocks for generating desired outputs in response to the specific inputs, that is to say, so as to implement the particular sink-side control algorithm. The FIFO control 29, for example, provides 'write' and 'read' signals to the FIFO storage device 19 to control input (write) and output (read) of data to and from the FIFO storage device 19. The read function clears space to receive new data. As noted, the register 27 provides a ready state signal to the FIFO control 29 in response to the ready pulse from the source domain control 23. If space is available in the FIFO storage device 19 to receive the ready data, the control 29 generates the write signal, causing the FIFO storage device 19 to accept input of the data from the ReadData register 21 in the source domain 11. The FIFO control 29 clocks the ready state register 27 (i.e. lets it update based on the value of ReadDataReady signal) when it generates the write signal, that is to say when it instructs the FIFO storage device 19 to accept one beat of data (128 bits) from the source.

As illustrated, the pulse serving as the ReadDataReady signal decrements the counter 25, indicating one less register location is available in the FIFO storage device 19. In that regard, the counter 25 is decremented in response to the ready pulse generated in the same domain 11, without any delay or latency for transfer of a signal between the two domains 11 and 13. The read signal from the FIFO control 29 on the sink side instructs the FIFO storage device 19 to output the data from one of its register locations to the sink 17 and clear that location in the device 19. Hence, the pulse of the read signal is supplied from the sink domain 13 across the boundary D-D, to increment the counter 25.

There will be some latency between the issuance of the read signal by the control 29 and the appearance of the corresponding signal as the FIFO entry free indication at the counter 25 in the source domain 11. The signaling latency may be due to the time required for the signaling to cross the chip. However, there may be additional state circuitry, represented generically by the delay/timing element 28 in the drawing, between the read signal and the FIFO entry free. Although shown in the sink domain 13, the circuitry 28 may be physically in either one or both of the domains. The additional circuitry, typically one or more flip-flops, insures proper signal levels and timing alignment across the boundary D between the domains. However, the additional circuitry 28 would add one or more cycles of delay to the latency between the assertion of the read signal by the control 29 and the appearance of the corresponding signal as the FIFO entry free indication at the counter 25. Although not shown for convenience, those skilled in the art will recognize that if such additional circuitry is provided, similar delay/timing elements would be provided on the other lines between the two domains, such as the ReadData line and the ReadDataReady line.

The counter 25 supplies the FIFO-space-free count to the FIFO control 23 in the source domain 11 for use in its determination to transmit new data across the boundary D-D. By decrementing the count each time data is made available to the FIFO 19 and incrementing the count each time that a location is cleared (as data is read off the FIFO 19), the value of the counter 25 tracks the amount of space (number of register locations) available or free in the FIFO storage device 19. However, because the counter 25 is in the source domain 11, the decrement somewhat precedes receipt of the ReadDataReady signal and response thereto in the sink domain 13. There is a certain delay or latency in transferring the pulse signal across the boundary D-D to the register 27. Conversely, the increment of the counter 25 in the source domain 11 somewhat trails or lags the read of data from the FIFO storage device 19 in the sink domain 13, due to the delay or latency in transferring the read signal across the boundary D-D.

The FIFO control 23 also is responsive to a data validity flag (V) in a one-bit register 31 set by the data source 15, when the source initially has data available for transfer to the sink 17. Stated another way, the source 15 sets the flag V in register 31 to inform the FIFO control 23 that there is valid new data available for loading into the ReadData register 21. The FIFO control 23 provides a clock (enable) signal to the one-bit register serving as the data validity flag (V) 31. When data has been successfully transferred to the FIFO 19 in the sink domain, the FIFO control 23 provides a clock (enable) signal to load the register 31 and thus the state of the validity flag (V). In operation, the source valid bit is sent from register 31 to the source FIFO control 23, to tell this FIFO control 23 that data is ready to be sent. The bit is cleared from register 31 when data is sent, unless new data simultaneously moves in from the source 15. In this manner, the FIFO control 23 controls the V flag in register 31 to allow the source 15 to set the flag (and input a new beat of data to the ReadData register 21) when the counter 25 indicates that there is room available for the new beat of data.

Figure 2A:
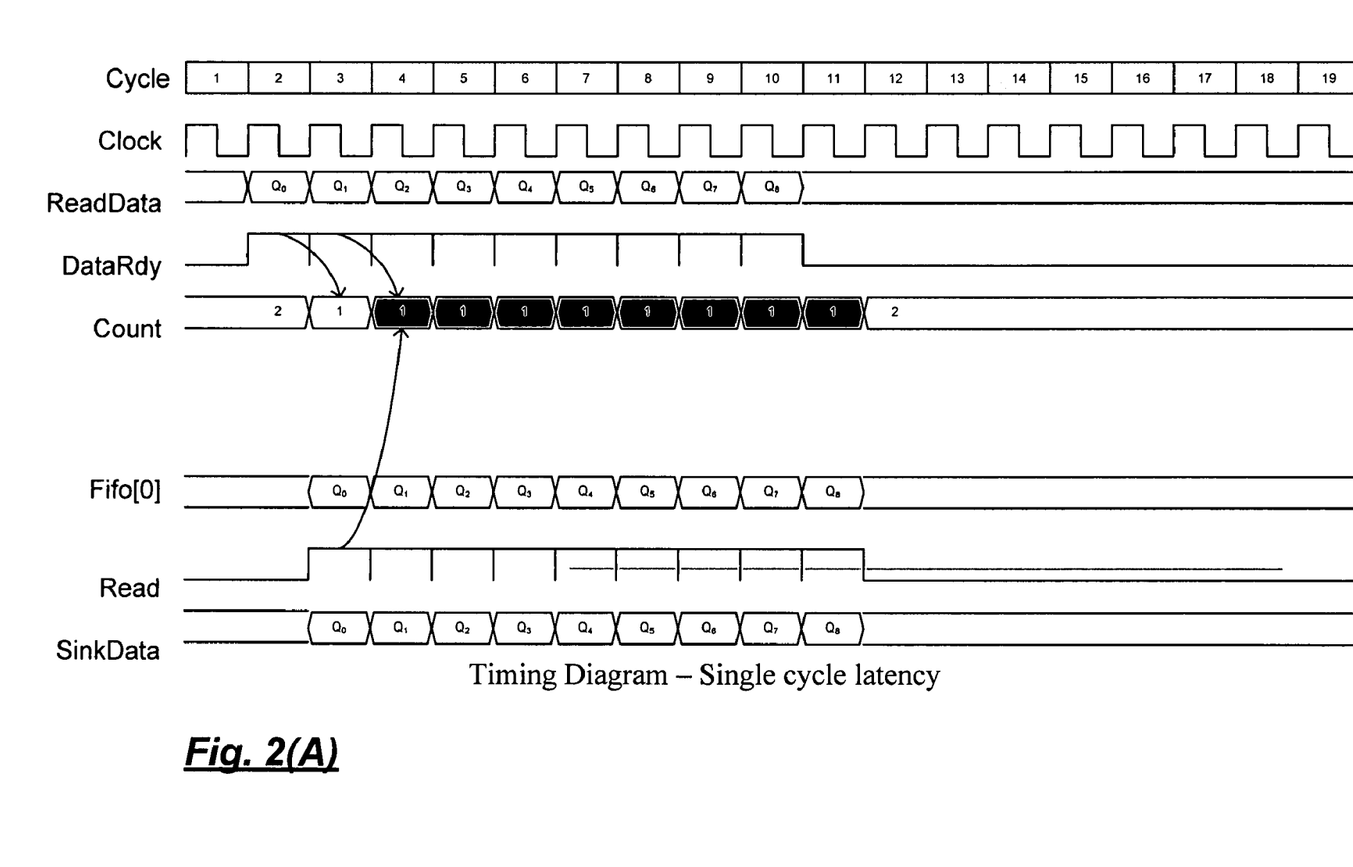
FIGS. 2(A) to 2(C) are timing diagrams useful in understanding the data exchange in the system of FIG. 1.
Figure 2B:
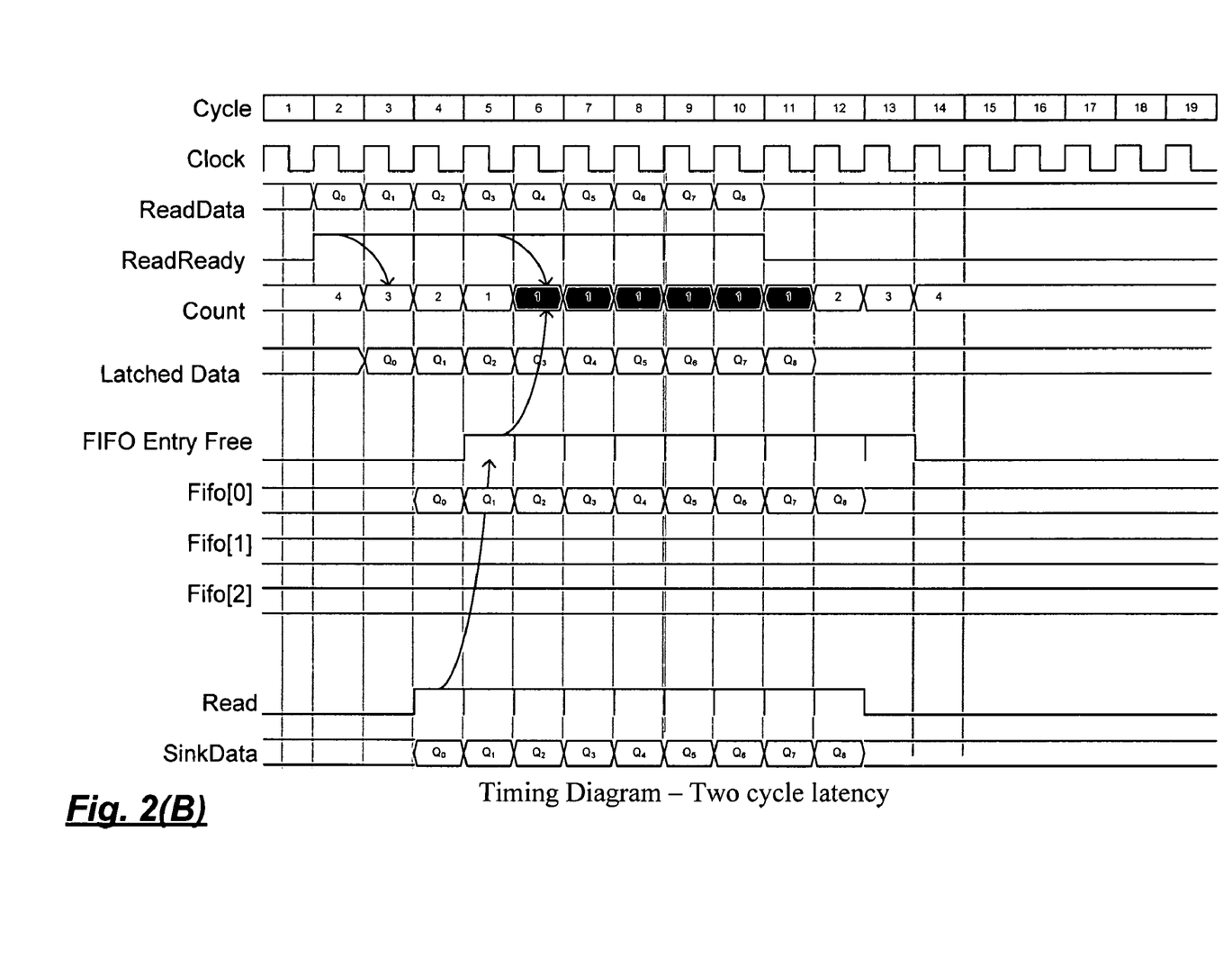
Figure 2C:
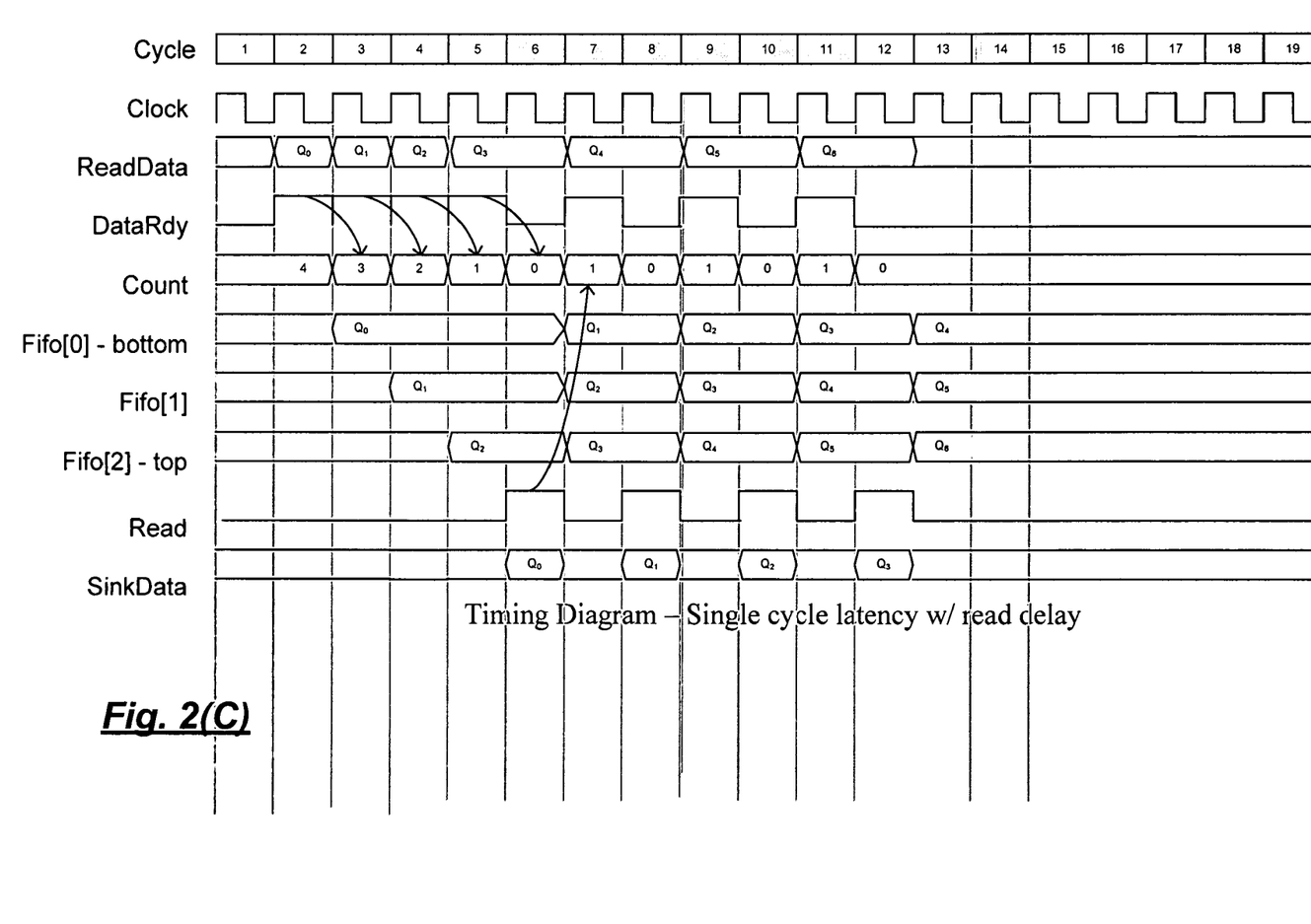

To appreciate the data transfer in the system of FIG. 1, it may be helpful to consider a specific sequence of operations of the system, with reference to simple timing diagrams as depicted in FIGS. 2(A) to 2(C). The top line in each drawing provides numbering of clock cycles, and the pulses of the clock are shown in the next line. In the examples, the clock is the same in both domains. The third line represents data entered in the ReadData registers 21, and the fourth line represents the ReadDataReady signal (abbreviated DataRdy in the signal diagrams).

Consider now FIG. 2(A) as a first example. In this example, for simplicity, the FIFO consists of a single line (Fifo[0]). The count (shown in the fifth line) represents the number of beats of data that can be sent. The count starts with one more than the number of FIFO positions. This additional beat represents the data that can be held "in flight" (in ReadData register). A count of zero indicates that the source data needs to be held from the previous cycle. Accordingly, the DataReady signal must not be asserted in such a cycle. Since the example of FIG. 2(A) has only one FIFO position, initially the count is set to 2.

In cycle 2, when data $Q_0$ first appears in the ReadData register 21, the FIFO control 23 first asserts the ReadDataReady signal (DataRdy). In the next cycle, because it has received the ReadDataReady signal, the counter decrements its count of the FIFO buffer locations available by 1. In the example, in the fifth line of the diagram, the count drops to 1 in the third cycle.

Assume for discussion of this example, that space is available in the FIFO. In response to the ReadDataReady signal in cycle 2, the FIFO accepts the first beat $Q_0$ of data and moves it to line Fifo[0] in the next cycle, that is to say in cycle 3. At the same time, in this example, the sink is ready and accepts that beat of data in this cycle (bottom line of the drawing), so the FIFO control 29 asserts the read signal (next to last line in the drawing), to allow reading of that beat of data out of the FIFO into the sink.

In this first example, the system exhibits a single cycle of latency between the domains. As a result of the latency between the domains, the read signal from the FIFO control 29 reaches the counter in the next (fourth) cycle, as the FIFO entry free signal shown in FIG. 1 or the arrow in FIG. 2(A). This signal represents a clearing of an entry from the FIFO, which normally would cause the counter to increment. However, a new beat of data is also available in that same cycle, as indicated by the continued ReadDataReady signal. The decrement responsive to the ReadDataReady signal offsets the increment responsive to the read signal, so the count remains at 1 (as shown by the shading in the Count line). In similar fashion, the count remains at 1 through cycle 11, that is to say as long as new data becomes available and data is being read from the FIFO in the sink domain.

In cycle 10, the last beat of data $Q_8$ is loaded in the ReadData register, and the ReadDataReady signal (DataRdy) remains high. However, in cycle 11, when that beat of data moves to the FIFO, and no new beat of data is available. The control 23 de-asserts the ReadDataReady (DataRdy in FIG. 2(A)) signal. In the next cycle, when the read signal from control 29 reaches the counter, the counter increments (there is no corresponding need to decrement because no new data is available). In this simple example, the count goes back up to 2, in cycle 12, after the last beat of data has moved through the FIFO to the sink.

FIG. 2(B) shows the timing for a similar example, in which the FIFO is three lines deep (positions Fifo[0], Fifo[1] and Fifo[2]), and there are two cycles of latency on the signaling between the two domains, as represented by the additional FIFO Entry Free line. The additional latency may be due to the inclusion of additional state circuitry 28, e.g. a flip-flop, between the read signal from the control 29 and the FIFO entry free signal input of counter 25. In view of the similarities, those skilled in the art should appreciate the operations represented by the signaling diagram shown in this drawing.

FIG. 2(C) is another single cycle latency example similar to FIG. 2(A), however, in FIG. 2(C) the FIFO is three lines deep (positions Fifo[0], Fifo[1] and Fifo[2]). Also, FIG. 2(C) shows the slower read by the Sink and thus the data moving through the lines of the FIFO. Again, the top line of the diagram provides numbering of clock cycles, and the pulses of the clock are shown in the next line. The third line represents data entered in the ReadData register 21. Of note, when data is available from the source and space is available in the FIFO, e.g. in cycles 2, 3 and 4, data moves into the ReadData register in one cycle and out from the register to the FIFO in the next cycle. For example, data beats $Q_0$, $Q_1$, and $Q_2$ reside in the register for only one cycle each. However, when data is in the ReadData register, but space is not available in the FIFO, a data beat remains in the register for two or more cycles. In the example, the beats of data starting with Q3 reside in the register for at least two cycles.

Again, the count (shown in the fifth line) represents the number of beats of data that can be sent. The count starts with one more than the number of FIFO positions, that is to say at 4 for the three line FIFO example of FIG. 2(C). This additional beat represents the data that can be held "in flight" in ReadData register. A count of zero indicates that the source data needs to be held from the previous cycle, as represented by the holding of each of the beats of data starting with Q3 in the register for at least two cycles. Again, the DataReady signal must not be asserted in a cycle when the count is 0.

As noted, in this example, the FIFO consists of three lines, therefore initially the count shown in the fifth line is set to 4. In cycle 2, when data $Q_0$ first appears in the register 21, the FIFO control 23 first asserts the ReadDataReady signal (DataRdy) shown in the fourth line of the diagram. In the next cycle (cycle 3), because it has received the ReadDataReady signal from the source domain control 23, the counter 25 decrements its count of the buffer locations available by 1. In the example, in the fifth line of the diagram, the count drops to 3 in the third cycle. Initially, the FIFO lines are empty, so the first beat of data can move into the FIFO and directly to the bottom line of the FIFO, that is to say into line Fifo[0], in the third cycle. The sink is not ready to receive that data until some time later (e.g. in cycle 6), as shown at the bottom of the diagram. So, Fifo[0] holds the first beat of data $Q_0$ for several cycles.

In cycle 3, however, a second beat of data $Q_1$ moves into the ReadData register, and the source side control 23 keeps the ReadDataReady (DataRdy) signal high. Since the counter has not yet received a read or FIFO entry free signal from the sink domain, the counter decrements the count again in cycle 4, in this case, to a value of 2. At this point in the example, two of the FIFO lines are empty, so the second beat of data can move into the FIFO and directly to the next to last line of the FIFO, that is to say into line Fifo[1], in the fourth cycle. The sink is still not ready to receive data until some time later (e.g. in cycle 6), as shown at the bottom of the diagram. So, Fifo[1] holds the second beat of data $Q_1$ for several cycles.

In cycle 4, a third beat of data $Q_1$ moves into the ReadData register, and the source side control 23 keeps the ReadDataReady (DataRdy) signal high. Again, the counter has not yet received a read or FIFO entry free signal from the sink domain in the next cycle, so that in cycle 5 the counter further decrements the count by 1, in this case, to a value of 1. At this point in the example, one of the FIFO lines is empty, so the second beat of data can move into the FIFO at line Fifo[0], in the fifth cycle. The sink is still not ready to receive that data until some time later, therefore, Fifo[0] initially holds the third beat of data $Q_2$.

In cycle 5, another beat of data $Q_3$ moves into the ReadData register, and the source side control 23 keeps the ReadDataReady (DataRdy) signal high. This time, since no data has moved out of the FIFO, in cycle 6 the counter further decrements the count to a value of 0. At this point in the example, none of the FIFO lines is empty, and there is data in the ReadData register. Accordingly, the DataReady signal is not asserted in this cycle. However, the fourth beat of data $Q_3$ is held "in flight" in ReadData register.

In the example, the sink first becomes ready to accept a beat of data in the sixth cycle (bottom line of the drawing), so the FIFO control 29 asserts the read signal (next to last line in the drawing), to allow reading of that beat of data out of the Fifo[0] into the sink. In this example, the system exhibits a single cycle of latency between the domains. As a result of the latency between the domains, the read signal from the FIFO control 29 reaches the counter in the next (seventh) cycle, as the FIFO entry free signal shown in FIG. 1 or the arrow in FIG. 2(C). This signal represents a clearing of an entry from the FIFO, which causes the counter to increment back to a 1 value.

When the first beat of data $Q_0$ moves into the sink in cycle 6, space is freed in Fifo[0], so other data in the FIFO moves down ($Q_1$ to Fifo[0] and $Q_2$ to Fifo[1]) in cycle 7. The top line Fifo[2] is empty and can now receive the next beat of data from the ReadData register, that is to say beat $Q_3$ at this point in the example. Because beat $Q_3$ has moved to the FIFO, the ReadData register now accepts the next beat of data $Q_4$.

In the example, the sink accepts data from the bottom of the FIFO every other cycle, so operations similar to those of cycles 6 and 7 alternate, e.g. so that the count alternates between 1 and 0 as the counter alternately decrements and then increments. As shown, the DataRegister holds each new beat of data "in flight" for two successive cycles, that is to say until space becomes available in the FIFO. In this way, the ReadData register is essentially an extra FIFO line, although it provides this function within the source domain.

As noted above, the counter 25 is located with the source 15 in the domain 11, rather than with the FIFO 19 itself in the domain 13. This is advantageous as there is typically latency for the signals from the FIFO to the source, meaning that the source cannot send data until some number of cycles after the FIFO becomes ready. In the illustrated example, the counter 25 does not provide a true snapshot in time of what is in the FIFO 19, because the counter incurs the latency penalty for incrementing. However, the FIFO space empty signal is available immediately to the source FIFO control 23 (without latency). Thus, for typical conditions, the counter 25 can be seen to "eat" the latency for the necessary signaling between the domains 11 and 13.

The cost here is that the counter 25 can be pessimistic in that it might sometimes say that data cannot be sent over when in fact there is room in the FIFO storage device 19, because the free signal from the control 29 has not yet propagated to the counter 25. However, this can be overcome in the illustrated design by sizing the FIFO depth according to the "free" signal latency, so that data can be continuously transferred. It is also possible to buy a little bandwidth by being able to send one last data beat when the source-side control 23 believes that the FIFO 19 is full, either by appropriate design of the logic of control 23 or by sizing the counter to N+1 (where N is the FIFO depth, e.g. the number of locations in FIFO 19).

By virtue of the local counter and the FIFO's depth, the source 15 can send data continuously. Thus, by sizing the FIFO properly, the transfers can occur without regard to the latency of the signals; hence the system is substantially "latency insensitive." Note that it is possible for latency to come into play here, specifically, when the destination or sink side does not drain the FIFO 19 fast enough, and the system loses the buffering equal to the latency. This may be compensated for by making the FIFO 19 deeper, to cover the typical data rates at which the FIFO 19 is drained. Thus, in typical conditions, data is continuously transferred.

Also, the system does not have to read data off of the FIFO 19 exactly when it decrements the counter 25. Instead, the signal to decrement the counter could lead the read so as to decrement the counter somewhat earlier, so long as the timing and latency can guarantee that the sink side will read a beat of data off of the FIFO device 19 and clear space for new data, before the source side can respond and forward new data.

As noted above, with proper sizing of the FIFO depth, it is possible to provide for substantially continuous data transfer between the two domains. For this purpose, the FIFO depth should be at least as big as the round trip signaling latency, i.e., the cycle count from ReadDataReady until FIFO Space Empty is visible back at the source. This number is affected by any intervening stages between the ReadData register 21 and the FIFO 19 as well as intervening latency between the FIFO and read requests from the sink.

The sizing of the FIFO may be more complicated when the sink can not read the data as fast as the source sends it. For example, the sink may consume data at half the rate it is sourced. The number of stages added depends on the amount of data sent at a time (i.e., a burst), the round trip signaling latency, and the rate of consumption by the sink. At most, the FIFO size would need to be increased by the size (cycle count) of the burst. However, since additional room will be made available in the FIFO as the sink reads the data, the actual FIFO will be somewhat smaller. Where burst size and intervals between bursts vary, determining the optimal size may entail simulations with various FIFO depths to achieve the desired continuous data transfer between the two domains.

The counter is initialized to the size of the FIFO storage device 19 and decremented and incremented as data is input to and output from the FIFO storage device 19. Hence, the range of permissible count values corresponds to the number N of locations, that is to say, the depth of the FIFO storage device 19. Even when the counter says there is not space free (count of 0), the control 23 will allow the source to load data into the register 21 and apply an additional set of the 128 bits of data to the FIFO input lines. The control will supply the ReadDataReady pulse, which is held in the register 27. Effectively, the register 21 and the transfer lines provide an extra register location for the FIFO storage device 19. Also, this mechanism essentially employs the FIFO to mask (in typical cases) the signaling latency between the source and the sink.

In the example of FIG. 1, the FIFO control 23 on the source side provided a single pulse as the signal indicating that a new valid beat of data was available and ready for transfer to the FIFO 19. However, instead of this pulse signaling of the ReadDataReady state from the source domain to the sink domain, the concepts may be adapted to utilize other techniques, such as a ping-pong signaling method. This ping-pong signaling method employs two signals between the source FIFO control and the Sink Ready logic. At most, one of these two signals is true. When data is sent across, the first signal is asserted. The next beat of data causes the first signal to be cleared while the second is asserted. The next beat of data causes the second signal to be cleared while the first is asserted, and so on. The sink side knows to look to the alternate signal after receiving data on one signal. This approach has the advantage that when the extra beat of data is sent after the source believes that the FIFO is full, the signal stays asserted until the counter is incremented and another beat of data is sent. Thus, there is no need to capture the pulse. Essentially, a continuous signal is asserted across the boundary indicated when valid data is ready and available to transfer to the FIFO.

Figure 3:
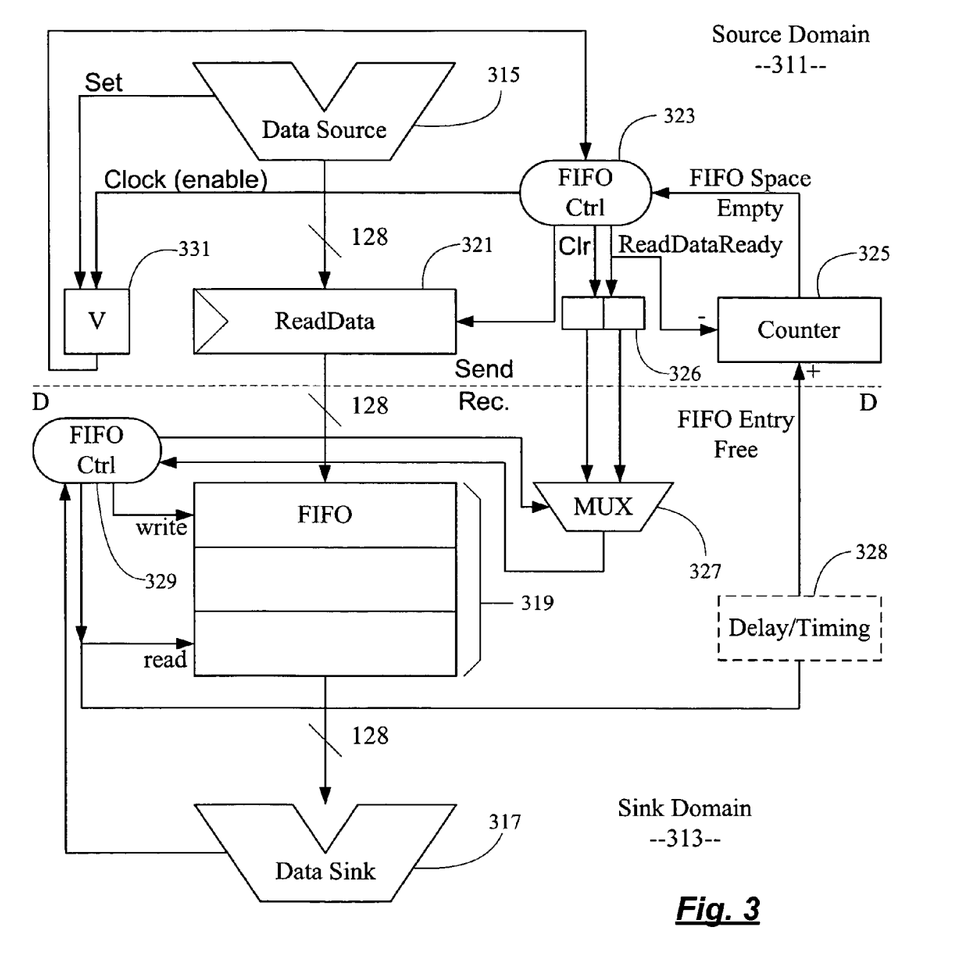
FIG. 3 is a functional block diagram of elements transferring data between domains via a first-in-first-out (FIFO) buffer, and a somewhat different set of elements for signaling and control of the data exchange.

FIG. 3 is a functional block diagram of a system, generally similar to that of FIG. 1, but utilizing the ping-pong signaling technique. Like the first example, this second illustrated system includes elements in two different domains, a source domain 311 desiring to send data and a sink domain 313 intended to receive the data. Essentially, an element in domain 311 represented generically by data source 315 has data available, and an element in domain 313 represented generically by the data sink 317 needs to receive that data for further processing, storage or the like.

The two domains are separated by a domain boundary, represented by the dotted line D-D. Again, the two domains may be different regions of a single semiconductor chip, different chips, or different devices connected via wiring, through a series of one or more registers, or other interface means, or two separate systems communicating via a local or wide area network. As in the earlier discussion, operations of the circuits in the two domains may be clocked relative to the same fundamental clock frequency (i.e., synchronous) or clocked relative to different fundamental clock frequencies (i.e., asynchronous).

For ease of discussion, it is assumed again that the two domains are synchronous and represent elements in close proximity that are directly connected together across the boundary, for example, two core sections of a processor chip interconnected or coupled together across a boundary region of the chip. The separation of the two sections may be physical, e.g. two separate parts or areas of the chip, or the separation may be purely logical that is to say simply between components operating at the data rate of the first domain and components operating at the data rate of the second domain.

As before, the two domains operate at different data rates. To compensate for the data rate difference of the domains 311 and 313 across the boundary D-D, the sink domain 313 includes a first-in-first-out (FIFO) storage device 319, essentially for buffering data received from the source domain 311. Again, the FIFO storage device may be implemented in any of a wide variety of physical architectures, such as registers or memories. For discussion purposes, it is convenient to think of the FIFO 319 as a series or stack of registers through which received data moves. One register or location is filled when a new beat of data is loaded or written into the device 319, and one register or location is cleared when a beat of data is offloaded or read off the device 319 to the sink 317.

On the source or sending side 311, the data source 315 supplies a beat of data, in this example 128 bits of data, to a register 321, sometimes referred to as a read data register. In the example, the register 321 is designated as the read data (ReadData) register. The ReadData register 321 holds the 128 bits of data and presents the bits of data on the lines for transferring the data across the boundary D-D to the input of the FIFO storage device 319. Although not shown in the drawing, additional logic may exist after the read data register and before the FIFO. While the register 321 holds the new beat of data, the data is available on the lines to the input of the FIFO storage device 319. However, when the new beat of data is first loaded into the register 321, there is some propagation delay before the data appears at the input of the FIFO storage device 319 in the sink domain 313.

A FIFO control 323 controls the flow of data to and through the ReadData register 321. The FIFO control 323 is a finite state machine, similar to the control 23 in FIG. 1, although the logic of the state machine of control 323 is slightly different, as will become apparent from the discussion below. When the source 315 has new data to send, it sets the (V) flag in register 331, and the FIFO control 323 causes the ReadData register 321 to present the new data if there was space available in the FIFO storage device 319 for the last beat of data, as indicated by a register-use counter 325 in the source domain 321. The initial value of the counter 325, and thus the permissible range of count values, corresponds to the number of locations in FIFO 319, that is to say, the FIFO depth. The control 323 can determine if there is space in the FIFO storage device 319 to receive a new beat of data by examining the state of the count, e.g. to see if the count is non-negative. Although shown as a separate element, the counter 325 may be integrated as part of the state machine serving as the FIFO control 323.

When the FIFO control 323 causes the ReadData register 321 to present the new data for input to the FIFO storage device 319, the FIFO control 323 again needs to signal the sink domain 313. However, in this case, the control 323 supplies the ReadDataReady signal to a ping-pong register 326, in the source domain 311. The ping-pong register 326 is essentially a 2-bit register, for example, implemented using two or more flip-flops. The register 326 is controlled to have three valid states as follows. The 0,0 state indicates that there is no valid data ready, yet. The 0,1 state is the first of two possibly valid states indicating that there is data ready to transfer to the FIFO 319. The 1,0 state is the second of the two possibly valid states indicating that there is data ready to transfer to the FIFO 329. As discussed below, data ready states are indicated in sequence by transitions between the 0,1 and 1,0 states. Of note, the control 323 and register 326 are configured so as not to produce a 1,1 state, as that state is not a valid signaling state in this protocol.

As data becomes available for transfer, the FIFO control 323 in the source domain 311 provides a ReadDataReady pulse signal to drive the states of the ping-pong register 326. The FIFO control 323 also supplies the ReadDataReady pulse signal to the decrement input (−) of the FIFO space usage counter 325. When no data is available or ready to send, and the counter indicates there was enough space in the FIFO for the last data sent, the FIFO control 323 clears the ping-pong register 326 (to the 0,0 state). Assume now that a beat of data has become available in the present cycle, and more data becomes available in later cycles. If no data was available in the previous cycle, and their was enough space in the FIFO for the previous transfer, the register 326 was in the 0,0 state. Then, the first pulse of the ReadDataReady signal causes the register 326 to change to the 0,1 data ready state, the second pulse of the ReadDataReady signal causes the register 326 to change to the 1,0 data ready state, the third pulse of the ReadDataReady signal causes the register 326 to change back to the 0,1 data ready state, and so on. In this way, successive pulses of the ReadDataReady signal cause the register 326 to alternate or 'ping-pong' between the two valid data ready states, until the FIFO control 323 clears the register 326 at a time when the source 315 does not have new data available for transfer and all previous data was captured.

The register 326 maintains each state until it receives a new pulse signal or a clear command from the FIFO control 323. As such, each state will appear on the 2-bit output lines of the register 326 continuously, for as long as the FIFO control 323 does not change the state of the register 326. The output lines of the register 326 supply the 2-bits of valid data state information across the boundary D-D to a multiplexer (MUX) 327 in the sink domain 313. The MUX 327 supplies state data to a FIFO control 329 in the sink domain 313, and the MUX operation is controlled by the FIFO control 329. Under control from the sink domain FIFO control 329, the MUX 327 presents a 1 on its output, each time a transition appears on its input, until the FIFO captures the data; that is to say, it presents a 1 each time the source domain 311 indicates that there is a new beat of data, or there is yet to be captured old data, ready to send to the FIFO storage device 19. If the MUX receives a 0,0 state on its inputs (no valid data ready to send), it always outputs a 0.

In the sink domain 313, the FIFO control 329 is another finite state machine. The state machine is similar to the control 29, although the logic of the state machine is slightly different, as will become apparent from the discussion below. The FIFO control 329, for example, provides 'write' and 'read' signals to the FIFO storage device 319 to control input (write) and output (read) of data to and from the FIFO storage device 319. As noted, the MUX 327 provides a 1 signal to the FIFO control 329 in response to the each new ping-pong state from the register 326 in the source domain control 323, indicating a new beat of data is available for transfer. If space is available in the FIFO storage device 319 to receive the ready data, the control 329 generates the write signal, causing the FIFO storage device 319 to accept input of the data from the ReadData register 321 in the source domain 311.

An alternate form of the ping-pong signaling may be implemented with a single-bit signal. In such a case, the toggling of the bit indicates the delivery of new data. This scheme eliminates the 0,0 state, replacing it with a lack of transition. The toggling can be turned into a pulse by replacing the MUX of FIG. 3 with an exclusive-OR gate. The output of the exclusive-OR would be true for each cycle there is data to be captured by the FIFO; either new data or old data that has not yet been captured.

As in the earlier example, the pulse serving as the ReadDataReady signal decrements the counter 325, indicating one less register location is available in the FIFO storage device 319. In that regard, the counter 325 is decremented in response to the ready pulse generated in the same domain 311, without any delay or latency for transfer of a signal between the two domains 311 and 313. The read signal from the FIFO control 329 on the sink side instructs the FIFO storage device 319 to output the data from one of its register locations to the sink 317 and clear that location in the device 319. Hence, the pulse of the read signal is supplied from the sink domain 313 across the boundary D-D, to increment the counter 325.

There will be some latency between the issuance of the read signal by the control 329 and the appearance of the corresponding signal as the FIFO entry free indication at the counter 325 in the source domain 311. The signaling latency may be due to the time required for the signaling to cross the chip. However, there may be additional state circuitry, represented generically by the delay/timing element 328 in the drawing, between the read signal and the FIFO entry free. Although shown in the sink domain 313, the circuitry 328 may be physically in either one or both of the domains. The additional circuitry, typically one or more flip-flops, insures proper signal levels and timing alignment across the boundary D between the domains. However, the additional circuitry 328 would add one or more cycles of delay to the latency between the assertion of the read signal by the control 329 and the appearance of the corresponding signal as the FIFO entry free indication at the counter 325. Although not shown for convenience, those skilled in the art will recognize that if such additional circuitry is provided, similar delay/timing elements would be provided on the other lines between the two domains, such as the ReadData line and the ReadDataReady line.

The counter 325 supplies the FIFO space free count to the FIFO control 323 in the source domain 311 for use in its determination to transmit new data across the boundary D-D. By decrementing the count each time data is made available to the FIFO 319 and incrementing the count each time that a location is cleared (as data is read off the FIFO 319), the value of the counter 325 tracks the amount of space (number of register locations) available or free in the FIFO storage device 319. However, because the counter 325 is in the source domain 311, the decrement somewhat precedes receipt of the state information from register 326 and response thereto in the sink domain 313. There is a certain delay or latency in transferring the 2-bits of state information across the boundary D-D to the MUX 327. Conversely, the increment of the counter 325 in the source domain 311 somewhat trails or lags the read of data from the FIFO storage device 319 in the sink domain 313, due to the delay or latency in transferring the read signal across the boundary D-D.

The FIFO control 323 also is responsive to a data validity flag (V) in a one-bit register 331 set by the data source 315, when the source initially has data available for transfer to the sink 317. Stated another way, the source 315 sets the flag V in register 331 to inform the FIFO control 323 that there is valid new data available for loading into the ReadData register 321. The FIFO control 323 provides a clock (enable) signal to the one-bit register serving as the data validity flag (V) 31. When data has been successfully transferred to the FIFO 319 in the sink domain, the FIFO control 323 provides a clock (enable) signal to load the register 331 and thus the state of the validity flag (V). In operation, the source valid bit is sent from register 331 to the source FIFO control 323, to tell this FIFO control 323 that data is ready to be sent. The bit is cleared from register 331 when data is sent, unless new data simultaneously moves in from the source 315. In this manner, the FIFO control 323 controls the V flag in register 331 to allow the source 315 to set the flag (and input a new beat of data to the ReadData register 321) when the counter 325 indicates that there is room available for the new beat of data.

Figure 4A:
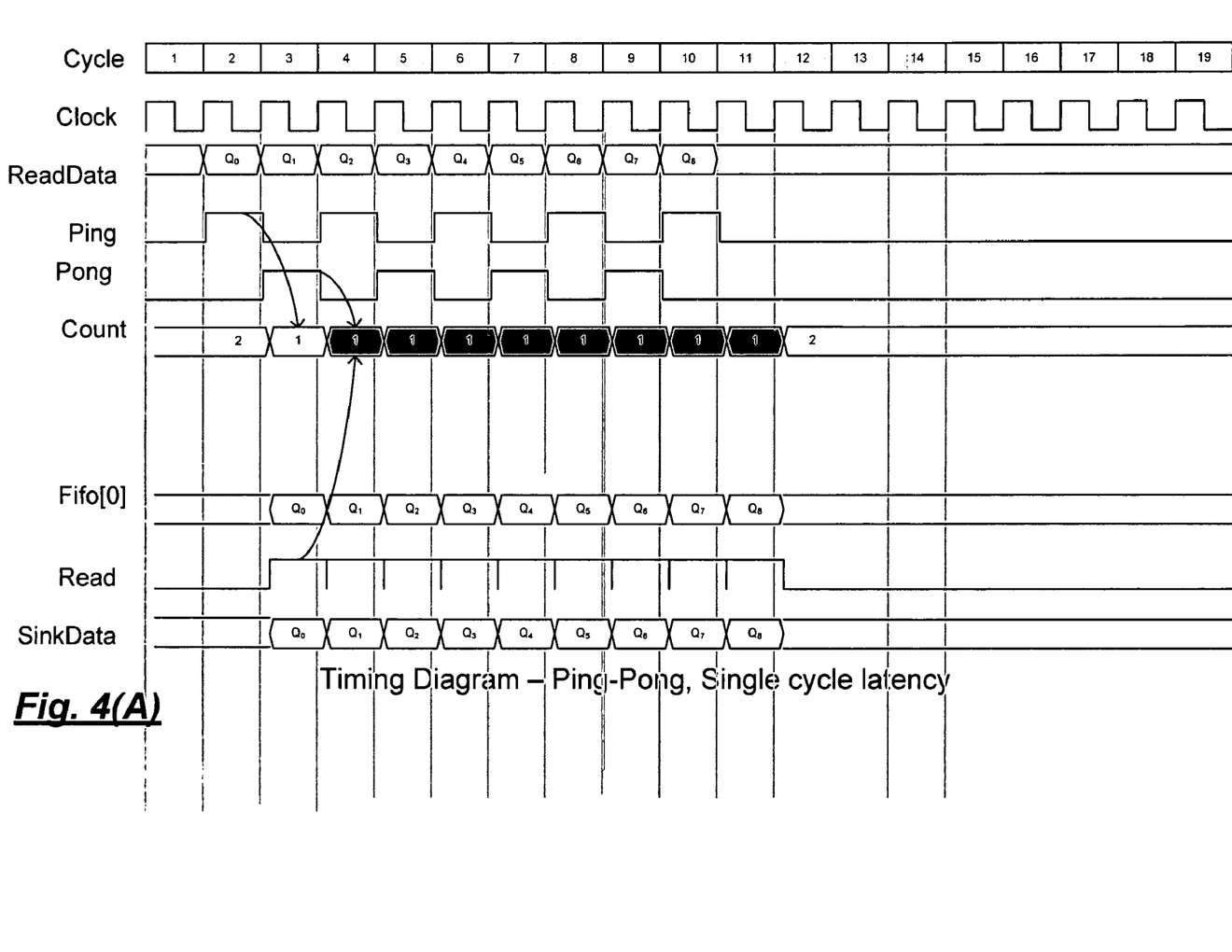
FIGS. 4(A) and 4(B) are timing diagrams useful in understanding the data exchange in the system of FIG. 3.
Figure 4B:
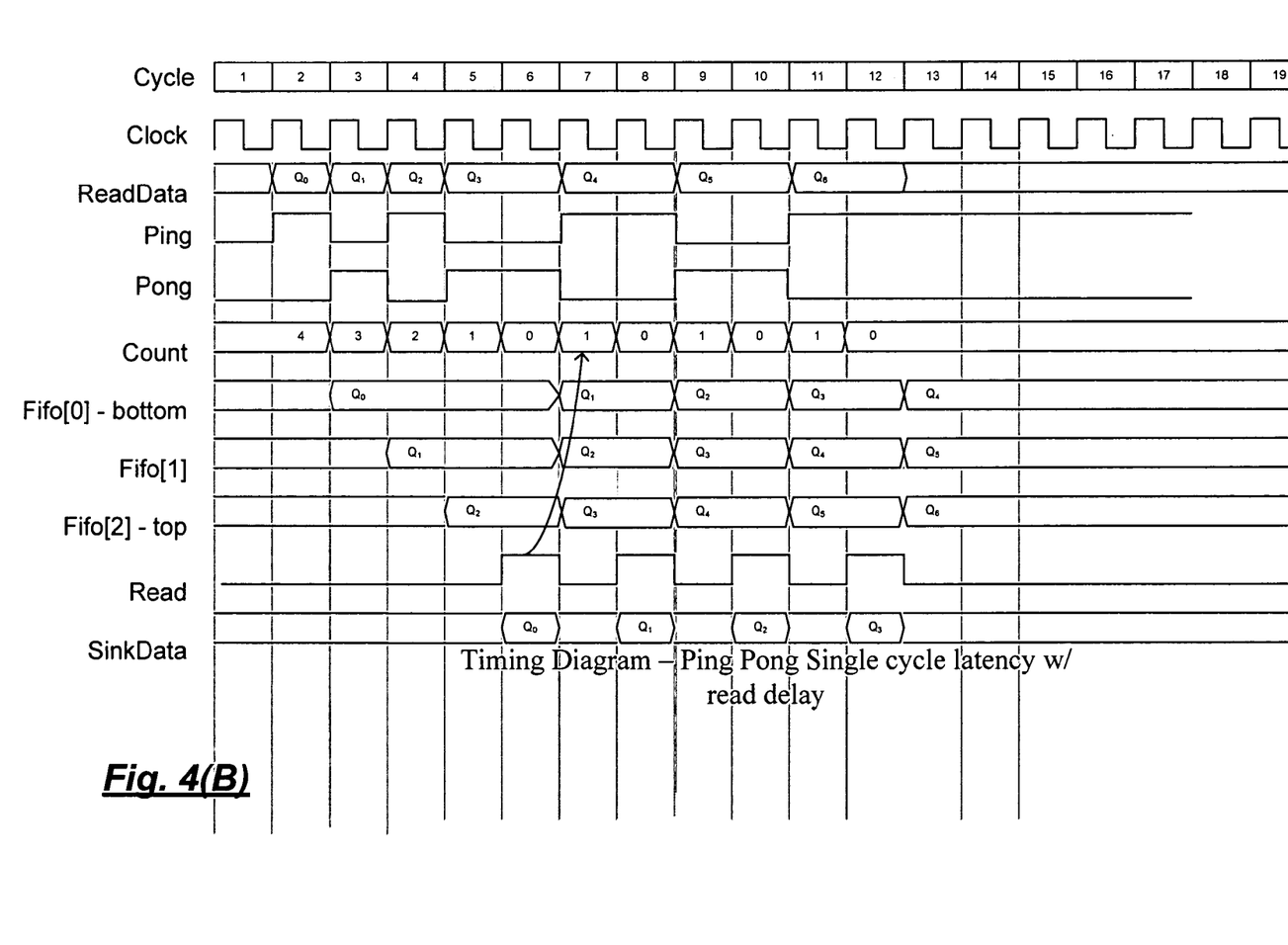

FIGS. 4(A) and 4(B) are timing diagrams of simple examples of operations of the system of FIG. 3. Generally, these examples are similar to those discussed above relative to FIGS. 2(A) and 2(C), however, here the signaling of read data ready from source domain takes the form of 'Ping' and 'Pong' signals as shown in the fourth and fifth lines of FIGS. 4(A) and 4(B). As shown in the drawings, each transition to one of the two valid Ping-Pong states (to 0,1 or to 1,0) signals data is ready in the register.

In these examples, the count again represents the number of beats of data that can be sent, and the count starts with one more than the number of FIFO positions (see fifth line in each of these figures). This additional beat represents the data that can be held "in flight" in the ReadData register in the source domain. A count of zero indicates that the source data needs to be held from the previous cycle. Accordingly, in the ping-pong protocol examples, a state change must not occur in such a cycle.

As noted above, the counter 325 is located with the source 315 in the domain 311, rather than with the FIFO 319 itself in the domain 313. As shown by the above discussion and FIG. 3, the second example similarly relies on the counter 325 in the source domain to track the usage of space in the FIFO storage device 319. Much as in the first example, the counter effectively "eats" the latency of signaling between the domains 311 and 313. Data is applied via the register 321 immediately when available and is held there available to the FIFO until read into the FIFO, essentially providing an additional storage location for the FIFO register stack. The counter 325 incurs the latency penalty for incrementing, but is available immediately to the source side.

The cost here is that the counter 325 can be pessimistic in that it might sometimes say that data cannot be sent over when in fact there is room in the FIFO storage device 319, because the free signal has not yet propagated to the counter 325. This may be overcome by sizing the FIFO depth according to the "free" signal latency, so that data can be continuously transferred. It is also possible to buy a little bandwidth by being able to send one last data beat via the register 321, when the source otherwise believes that the FIFO is full, either by appropriate design of the logic 323 or by sizing the counter to N+1 (where N is the FIFO depth, e.g. number of locations in the FIFO 319).

By virtue of the local counter and the FIFO's depth, the source 315 can send data continuously. Thus, by sizing the FIFO 319 properly, the transfers can occur without regard to the latency of the signals; and the processing is substantially "latency insensitive." Note that it is possible for latency to come into play here, specifically, when the destination does not drain the FIFO 319 fast enough, and loses the buffering equal to the latency. This is compensated for by making the FIFO 319 deeper to cover the typical data rates at which the FIFO 319 is drained. Thus, in typical conditions, data is continuously transferred. The depth of the FIFO, to achieve substantially continuous transfer of data between the domains would be similar to that discussed above relative to the example of FIG. 1.

Also, the system does not have to read data off of the FIFO 319 exactly when it decrements the counter 325. Instead, the signal to decrement the counter could lead the read so as to decrement the counter somewhat earlier, so long as the timing and latency can guarantee that the sink side will read a beat of data off of the FIFO device 319 and clear space for new data, before the source side can respond and forward new data These advantages of the second example are substantially similar to those of the first example. However, the ping-pong signaling techniques add some unique benefits. With the ping-pong approach, when the extra beat of data is sent after the source believes that the FIFO is full, the signal stays asserted until the counter 325 is incremented and another beat is sent. Thus, there is no need to capture and hold the ReadDataReady pulse on the sink side.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   receiving data from a first domain at an input to a storage device in a second domain, wherein the first domain and the second domain operate at different data rates;
   receiving a continuous ready signal at a controller in the second domain in response to a first signal that is received from the first domain, the first signal indicating that the data is available at the input to the storage device;
   loading the data into the storage device in response to the continuous ready signal;
   clearing the continuous ready signal concurrently with loading the data into the storage device; and
   sending a second signal to increment a counter in the first domain when a data entry is read from the storage device;
   wherein, when space is not available in the storage device to store the data, the data is held at the input to the storage device in the second domain by a first register in the first domain until the storage device stores the data, and
   wherein the continuous ready signal is provided by a second register in the second domain, the second register configured to receive the first signal, and wherein clearing the continuous ready signal includes providing a clear signal from the controller to the second register.

2. The method of claim 1, wherein the storage device is a first-in-first-out (FIFO) storage device.

3. The method of claim 1, wherein the first domain and the second domain are different regions of a single semiconductor chip that are separated by a boundary region.

4. The method of claim 1, wherein the first signal includes a pulse corresponding to a single clock cycle of the first domain.

5. A method comprising:
receiving data from a first domain at an input to a storage device in a second domain, wherein the first domain and the second domain operate at different data rates;
receiving a ready signal at a controller in the second domain in response to a first signal that is received from the first domain, the first signal indicating that the data is available at the input to the storage device;
loading the data into the storage device in response to the ready signal;
sending a second signal to adjust a counter in the first domain when a data entry is read from the storage device;
wherein, when space is not available in the storage device to store the data, the data is held at the input to the storage device in the second domain by a first register in the first domain until the storage device stores the data after space becomes available,
wherein the ready signal is continuously received at the controller until the data is loaded into the storage device, and
wherein the first signal includes a pulse corresponding to a single clock cycle of the first domain, and wherein the ready signal is received from a second register in the second domain, the second register configured to continuously provide the ready signal in response to receiving the pulse.

6. The method of claim 5, further comprising:
receiving second data from the first register at the input to the storage device after sending the second signal; and
wherein, when space is not available in the storage device to store the second data, the second data is held at the input to the storage device by the first register until space becomes available so that the storage device stores the second data.

7. The method of claim 5, wherein the first register and the storage device are directly connected and are within a single processing device.

8. A method comprising:
loading first data from a data source to a register in a first domain;
providing the first data from the register to an input of a first-in-first-out (FIFO) storage device in a second domain, the second domain having a data rate that is different from a data rate of the first domain;
when the FIFO storage device does not have available space to store the first data, holding the first data at the input of the FIFO storage device until the first data is subsequently stored at the FIFO storage device, wherein the first data is held at the input of the FIFO storage device by the register;
controlling a counter in the first domain to indicate a reduction of available storage space of the FIFO storage device;
sending a first signal to the second domain, the first signal indicating that the first data is available to the FIFO storage device, the first signal being a continuous signal provided to a first input of a multiplexer of the second domain; and
when second data is available from the data source and the counter indicates that space is available in the FIFO storage device:
loading the second data to the register; and
sending a third signal to a second input of the multiplexer to indicate that the second data is available to the FIFO storage device.

9. The method of claim 8, further comprising:
receiving a second signal from the second domain, the second signal corresponding to an increase of the available storage space of the FIFO storage device; and
adjusting the counter in response to the second signal.

10. The method of claim 9, wherein the counter is decremented to indicate a reduction of the available storage space, and wherein the counter is incremented in response to the second signal.

11. The method of claim 8 further comprising alternating between the first signal and the third signal to indicate consecutive data pulses that are loaded to the register from the data source.

12. A method comprising:
receiving data from a first domain at an input to a storage device in a second domain, wherein the first domain and the second domain operate at different data rates;
receiving a continuous ready signal at a controller in the second domain in response to a first signal that is received from the first domain, the first signal indicating that the data is available at the input to the storage device;
loading the data into the storage device in response to the continuous ready signal;
clearing the continuous ready signal concurrently with loading the data into the storage device;
sending a second signal to increment a counter in the first domain when a data entry is read from the storage device;
receiving a third signal from the first domain;
wherein the first signal and the third signal both correspond to a data available state of a first register in the first domain;
wherein the continuous ready signal is provided by a multiplexer in the second domain, the multiplexer configured to receive the first signal at a first input and to receive the third signal at a second input, wherein clearing the continuous ready signal includes sending a control signal from the controller in the second domain to the multiplexer; and
wherein, when space is not available in the storage device to store the data, the data is held at the input to the storage device in the second domain by the first register until the storage device stores the data.

13. A device comprising:
a register configured to store data from a data source and to continually provide the data to an input of a storage device, wherein the register is in a first domain that operates at a first data rate and the storage device is in a second domain that operates at a second data rate that is different than the first data rate;
a counter in the first domain configured to indicate an amount of available storage space at the storage device;
a controller configured to cause the register to load data from the data source in response to the counter indicating that the storage device has available storage space and to generate a first signal to indicate when the data is available;
means for signaling a data ready state to the second domain;
wherein the counter is configured to indicate a reduced amount of the available storage space in response to the first signal and to indicate an increased amount of available storage space in response to a second signal that is received from the second domain; and wherein the means for signaling the data ready state includes a two-bit register configured to send a first data ready state signal, a second data ready state signal, and a no data state signal to the second domain, wherein each of the first data ready state signal and the second data ready state signal corresponds to a state of the register.

14. The device of claim 13, wherein the two-bit register is configured to alternate between sending the first data ready state signal and the second data ready state signal when consecutive data pulses are received at the register.

* * * * *